United States Patent
Tison et al.

(10) Patent No.: US 7,150,201 B2
(45) Date of Patent: Dec. 19, 2006

(54) SYSTEM AND METHOD FOR MEASURING FLOW

(75) Inventors: Stuart A. Tison, McKinney, TX (US); Shiliang Lu, Plano, TX (US)

(73) Assignee: Celerity, Inc., Austin, TX (US)

( * ) Notice: Subject to any disclaimer, the term of this patent is extended or adjusted under 35 U.S.C. 154(b) by 0 days.

(21) Appl. No.: 11/012,750

(22) Filed: Dec. 15, 2004

(65) Prior Publication Data

US 2006/0123920 A1   Jun. 15, 2006

(51) Int. Cl.
*G01F 1/00* (2006.01)
(52) U.S. Cl. ....................................... 73/861
(58) Field of Classification Search ............. 73/861.01, 73/195, 196, 197, 198
See application file for complete search history.

(56) References Cited

U.S. PATENT DOCUMENTS

| | | | |
|---|---|---|---|
| 4,867,375 A | * | 9/1989 | Ueki et al. ............... 236/12.12 |
| 5,299,447 A | * | 4/1994 | Caron ........................ 73/1.26 |
| 5,900,534 A | * | 5/1999 | Miller et al. ............... 73/24.05 |
| 6,119,710 A | | 9/2000 | Brown |
| 6,216,726 B1 | | 4/2001 | Brown et al. |

* cited by examiner

*Primary Examiner*—Jewel Thompson
(74) *Attorney, Agent, or Firm*—Lowrie, Lando & Anastasi, LLP (57) ABSTRACT

One embodiment of the present invention can comprise a primary flow measurement system, a secondary flow measurement system in fluid communication with the primary flow measurement system and a control coupled to the primary flow measurement system and the secondary flow measurement system. The controller can comprise a processor and a memory accessible by the processor. The processor can execute computer instructions stored on the memory to calculate a flow rate using the primary flow measurement system, in a first mode of operation, and calculate the flow rate using the secondary flow measurement system, in a second mode of operation. The computer instructions can be further executable to switch between the first mode of operation and the second mode of operation based on a predefined parameter.

35 Claims, 3 Drawing Sheets

FIG. 4

SYSTEM AND METHOD FOR MEASURING FLOW

TECHNICAL FIELD OF THE INVENTION

Embodiments of the present invention relate generally to flow measuring systems and more particularly to a system and method for measuring a flow utilizing both a primary flow measurement technique and a secondary flow measurement technique.

BACKGROUND

A number of flow measurement techniques are currently used to calibrate mass flow controllers. Primary flow measurement techniques, which derive their accuracy from constants of nature or from other primary measurements such as mass and time, include gravimetric techniques, constant pressure techniques and constant volume techniques. The first primary technique, gravimetric measurement, involves measuring the amount of mass either gained or lost over a time interval. Gravimetric techniques are generally sufficient for measuring higher rate flows where mass loss is significant, but suffer shortcomings in measuring lower rate flows because they typically have insufficient resolution to measure mass flow rates on the order of micro-moles per minute.

The next primary technique, the constant pressure technique, uses a variable volume chamber to keep gas pressure constant. The mass flow is measured based on gas state equations with the mass flow rate depending on the change in volume over time. This technique can work well over a range of mass flow rates, but may require an elaborate system for controlling the volume of the pressure chamber. Thus, the constant pressure technique suffers limitations in calibrating mass flow controllers because constructing a constant pressure chamber (i.e. a variable volume chamber) can require a significant number of moving parts that can cause mechanical complications. As the range of mass flow rates for which the constant pressure chamber is configured increases, the complexity and cost of the constant pressure system will also increase.

The third primary flow measurement technique, the constant volume technique, relies on similar state equations as the constant pressure technique, but the mass flow rate is dependent on the change in pressure, rather than volume, over time. This technique has become popular for calibrating mass flow controllers because of the simplicity of the system (i.e. there are few moving parts). Again, however, the constant volume technique suffers deficiencies for calibrating mass flow controllers because the constant volume technique can typically only be used over a small range of mass flow rates. This limitation exists because, if the flow rate is too high for a given chamber volume, pressure changes associated with the high mass flow rate will be too abrupt to be accurately measured and may quickly exceed the safety limitations of the chamber. Although larger constant volume chambers can be constructed, practical considerations of safety, space and cost establish an upper limit on the capability of this flow measurement technique.

In general, the disadvantage of primary flow measurement techniques is that each technique is limited to a particular flow range where that technique's uncertainties and design limitations are best suited. For this reason, users must typically employ multiple independent flow calibrations systems utilizing several different primary techniques to cover the range of flows for industrial measurements. Alternatively, users can employ independent secondary techniques, such as sonic nozzles (also known as critical flow venturis or critical flow nozzles), laminar flow meters, ultrasonic flow meters, coriolis flow meters, thermal mass flow meters and others. These can be used over a range of flow rates but must be continually calibrated.

SUMMARY OF THE INVENTION

Embodiments of the present invention provide systems and methods for measuring flow that substantially reduce or eliminate the disadvantages associated with previously developed flow measurement methods and systems. More particularly, embodiments of the present invention provide a system and method for measuring fluid flow across a range of flow rates by combining the features of a primary flow measurement technique with those of a secondary flow measurement technique in order to cover a wider range of dynamic flows.

One embodiment of the present invention can comprise a primary flow measurement system, a secondary flow measurement system in fluid communication with the primary flow measurement system and a controller coupled to the primary flow measurement system and the secondary flow measurement system. The controller can comprise a processor and a memory accessible by the processor. The processor can execute computer instructions stored on the memory to calculate a flow rate using the primary flow measurement system in a first mode of operation, and calculate the flow rate using the secondary flow measurement system in a second mode of operation. The computer instructions can be further executable to switch between the first mode of operation and the second mode of operation based on a predefined parameter.

Another embodiment of the present invention can comprise a constant volume chamber, a sonic nozzle in fluid communication with the constant volume chamber, one or more valves configured to direct a flow of a fluid to the constant volume chamber and the sonic nozzle, sensors configured to read one or more parameters of the fluid in the system, and a controller coupled to the sensors configured to receive measurements from the sensors. The controller can comprise a processor and a memory accessible by the processor. The processor can execute computer instructions stored on the memory to calculate the flow rate as fluid accumulates in the constant volume chamber in a first mode of operation, calculate the flow rate as the fluid flows through the sonic nozzle in a second mode of operation, and switch between the first mode of operation and the second mode of operation.

Yet another embodiment of the present invention can include a method for measuring a flow rate comprising for a first mode of operation, calculating the flow rate as fluid accumulates in a constant volume chamber for a first range of flow rates; for a second mode of operation, calculating the flow rate as the fluid flows through the sonic nozzle; and switching between the first mode of operation and the second mode of operation.

Embodiments of the present invention, thus, can use primary measurement techniques to attain accurate measurement capabilities while using secondary techniques to extend the flow measurement range of the primary technique. Because embodiments of the present invention use multiple flow measurement techniques, the present invention can provide a flow measurement system that is self-calibrating and scalable to a wide range of flows.

The present invention provides an advantage over previously developed mass flow measurement techniques by combining both primary and secondary flow measurements techniques. This allows calibration of a mass flow controller over a range of flow rates without requiring an independent primary technique and secondary technique.

Embodiments of present invention provide another advantage by providing a system for calibrating a secondary flow measurement system based on measurements from a primary flow measurement system. Because the secondary flow measurement system (e.g. sonic nozzle system) can be recalibrated in real time based on flow measurements from the primary technique (e.g. constant volume system), the secondary flow measurement system does not have to be removed from the flow measurement system to be recalibrated.

Embodiments of the present invention provide yet another advantage over previously developed flow measurement techniques because measurements taken using the secondary flow measurement technique can be compared to measurements taken using the primary flow measurement technique. If an error is detected, this may mean that the secondary flow measurement technique must be recalibrated. Thus, embodiments of the present invention can detect when recalibration of the secondary flow measurement technique is required.

Embodiments of the present invention provide yet another advantage over previously developed flow measurement systems and methods by extending the range of primary flow measurement techniques through the use of a secondary flow measurement technique.

BRIEF DESCRIPTION OF THE DRAWINGS

For a more complete understanding of the embodiments of the present invention and the advantages thereof, reference is now made to the following description taken in conjunction with accompanying drawings in which like reference numerals indicate like features and wherein.

DETAILED DESCRIPTION OF THE INVENTION

Preferred embodiments of the present invention are illustrated in the Figures, like numerals being used to refer to like and corresponding parts of the drawings.

Embodiments of the present invention provide a system and method for measuring the flow rate of a fluid (e.g., a liquid, a gas, a gas vapor mix or other fluid) across a range of flow rates by combining the features of a primary flow measurement technique with those of a secondary flow measurement technique. In one embodiment of the present invention, a primary flow measurement system (e.g., a constant pressure system, a constant volume system, a gravimetric measurement system or other primary flow measurement system known in the art) can be in fluid communication with a secondary flow measurement system (e.g., a sonic nozzle system, a laminar flow meter, an ultrasonic flow meter, a coriolis flow meter, a thermal mass flow meter or other secondary flow measurement system known in the art). A controller can receive measurements of fluid parameters (e.g., temperature, pressure or other fluid parameter known in the art) from sensors associated with the primary flow measurement system and the secondary flow measurement system. The controller, in a first mode of operation, can calculate the flow rate of a fluid using the primary flow measurement system and, in a second mode of operation, can calculate the flow rate of the fluid using the secondary flow measurement system. The controller can automatically switch between modes of operation based on one or more predefine parameters. The flow rates calculated by the controller can be used to calibrate mass flow controllers, mass flow meters and other instrumentation.

Figure 1:
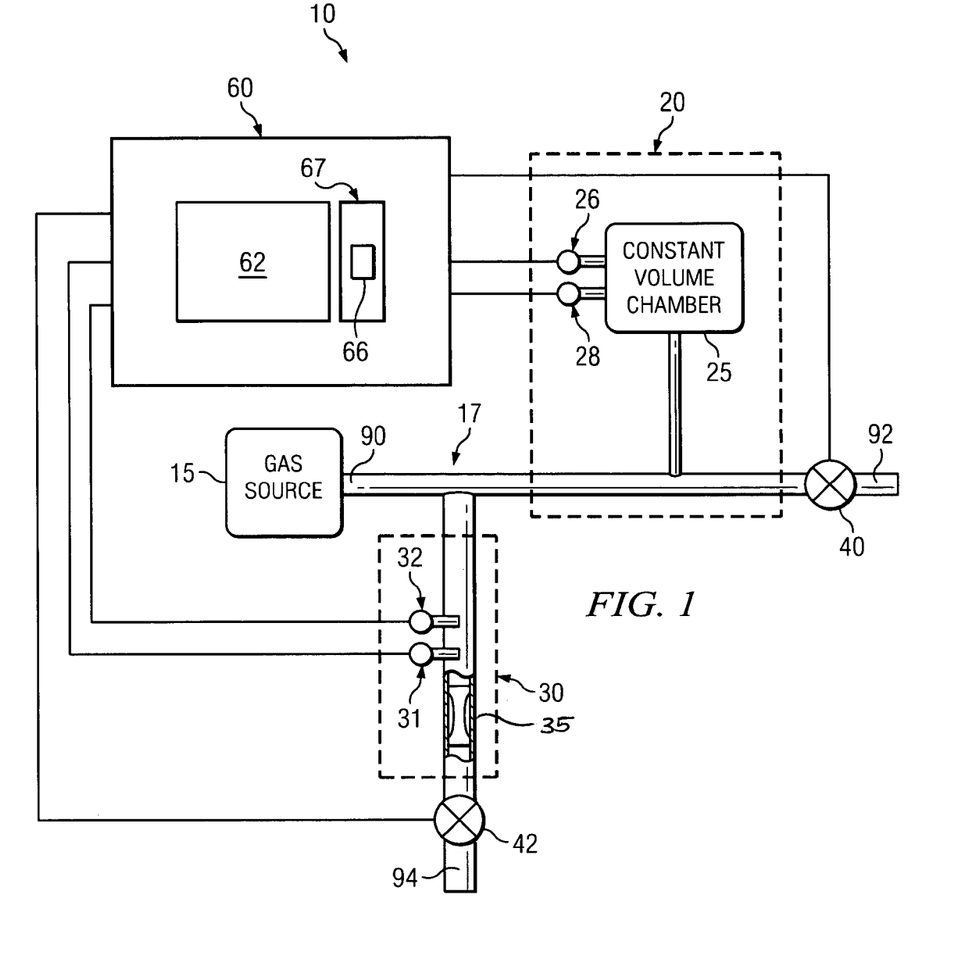
FIG. 1 is a diagrammatic representation of one embodiment of a flow measurement system.

FIG. 1 is a diagrammatic representation of one embodiment of a flow measurement system 10 employing a primary flow measurement system and a secondary flow measurement system. Flow measurement system 10 can include a gas source 15 for providing a gas flow to a constant volume system 20 and a sonic nozzle system 30 via a system of gas lines 17. Constant volume system 20 can include a constant volume chamber 25 and sensors for reading the pressure (e.g. pressure sensor 26), temperature (e.g. temperature sensor 28) and/or other parameters of the gas in system 10. Similarly, sonic nozzle system 30 can include a sonic nozzle 35 and instrumentation (e.g. pressure sensor 31 and temperature sensor 32), which may be the same as or different than that utilized by constant volume system 20. Sonic nozzle 35 can have a non-adjustable cross-sectional area or an adjustable cross-sectional area. A system of valves (e.g., valve 40 and valve 42) can regulate gas flow through flow measurement system 10.

A controller 60 can receive temperature, pressure and/or other measurements from the sensors and calculate the flow rate of gas through system 10. Controller 60 can determine the mass or volumetric flow rate of a gas through system 10 based on the state of the gas and the configuration of the constant volume system or the sonic nozzle system. This analysis can be carried out by microprocessor 62, based on software instructions 66 stored in computer readable memory 67 (e.g. RAM, ROM, magnetic storage device or other computer readable memory known in the art). Additionally, controller 60 can send control signals to valve 40 and valve 42 to configure the set of valves to direct the gas flow to sonic nozzle 35 and/or constant volume chamber 25. It should be noted that while controller 60 is shown as a single controller, the functionality of controller 60 can be distributed among multiple controllers which may be part of constant volume system 20 and/or sonic nozzle system 30. Moreover, the input and output signals from microprocessor 62 can undergo additional intermediate logic and/or conditioning (not shown for the sake of simplicity), such as digital to analog conversion.

Gas source 15 can provide a flow of gas through gas lines 17 by virtue of the fact that point 90 is at a higher pressure than points 92 or 94. As would be understood by those of ordinary skill in the art, there are a variety of methods to provide this pressure differential across system 10. When valve 40 and valve 42 are open, the gas will flow towards points 92 and 94 to eventually exit system 10. When only valve 42 is closed, the gas will flow towards point 92 and out system 10. When only valve 40 is closed, the gas will flow towards point 94 (i.e., through sonic nozzle system 30). When both valve 40 and valve 42 are closed gas will accumulate in constant volume chamber 25. By changing which valves are opened or closed, controller 60 can, thus, regulate the flow of gas to constant volume system 20 or sonic nozzle system 30.

When both valve 40 and valve 42 are closed, in the embodiment of FIG. 1, gas will accumulate in constant volume chamber 25 and, consequently, the pressure in constant volume chamber 25 will increase. In this case, controller 60 can use the change of pressure over time (dP/dt) as the gas accumulates in constant volume chamber 25 to calculate the flow rate. Since the mass of a gas in a fixed volume is dependant on the size of the volume, the pressure of the gas and the temperature of the gas and since the volume and temperature do not deviate significantly, controller 60 can approximately calculate the mass flow rate using constant volume system 20 as follows:

$$\frac{dm}{dt} = \frac{dP}{dt}\frac{V}{RT} \quad [\text{EQ. 1}]$$

$P$ = Pressure
$T$ = Temp
$R$ = Gas Constant
$t$ = time
$V$ = volume

As would be understood by those of ordinary skill in the art, EQ 1 is easily extendable to mixed gases and gas vapor mixtures. Additionally, a gas compressibility factor can be used as is understood in the art. Moreover, controller 60 can calculate the mass flow rate based on dP/dt according to any scheme known in the art. Additionally, controller 60 can be further configured to account for any changes in gas temperature that may occur using well known thermodynamic equations. The volumetric flow rate can either be calculated in a manner similar to the mass flow rate or can be calculated based on the mass flow rate and density of the gas in system 10.

According to embodiments of the present invention, the primary flow measurement technique may be performed as described in ISO 5725-1 or can include rate of rise techniques such as those described in U.S. patent application Ser. No. 10/887,591, entitled "Method and System for Flow Measurement and Validation of a Mass Flow Controller," by Tison et al., filed Aug. 7, 2004, which is hereby fully incorporated by reference herein.

When valve 42 is opened (with valve 40 remaining closed in the example of FIG. 1), gas can flow through sonic nozzle 35. In this case, controller 60 can calculate the flow rate using sonic nozzle system 30. The mass flow rate through sonic nozzle 35 can be governed by the temperature (T) of the gas, the gas heat capacity ratio (Y), the gas constant (R), the gas density (ρ) (which is either known or can be calculated based on the gas constant, upstream pressure and temperature) and the cross sectional area (A) of sonic nozzle 35 such that:

$$massflowrate = \rho A \sqrt{\gamma RT} \quad \text{or} \quad [\text{EQ. 2}]$$

$$massflowrate = \frac{PA\sqrt{\gamma RT}}{RT} \quad [\text{EQ. 3}]$$

$A$ = cross sectional area of sonic nozzle
$R$ = gas constant
$T$ = Temperature
$P$ = Pressure upstream of sonic nozzle
$\rho$ = gas density (known or equal to $P/(RT)$)
$\gamma$ = Heat capacity ratio As shown in EQ. 3, the mass flow rate in system 10 is directly proportional to the pressure upstream of sonic nozzle 35. Consequently, controller 60 can calculate the flow rate based on the pressure upstream of sonic nozzle 35 or the gas' density. For current sonic nozzles to approximately adhere to EQ. 2 and EQ. 3, the upstream pressure (P) should be at least two times the downstream pressure (e.g. the pressure at point 92), though the present invention can incorporate new sonic nozzles that require a smaller pressure differential as they are developed. It should be noted that the cross-sectional area of the sonic nozzle can be adjustable.

Thus, according to one embodiment of the present invention, controller 60 can, in a first mode of operation, calculate a flow rate as a fluid accumulates in a constant volume chamber based on the change in pressure over time and, in a second mode of operation, calculate the flow rate as the fluid passes through the sonic nozzle based on the density of the fluid or the pressure of the fluid upstream of the sonic nozzle.

In the embodiment shown in FIG. 1, both sonic nozzle 35 and constant volume chamber 25 are upstream of first valve 40. Consequently, when valve 40 is closed and valve 42 opened to direct the gas flow to sonic nozzle system 30, the pressure will initially rise in constant volume chamber 25 until constant volume chamber 25 equilibrates. When this occurs, a steady pressure (P) will establish in front of (i.e., upstream of) sonic nozzle 35. Controller 60 can be configured to delay calculating flow according to the second mode of operation until constant volume chamber 25 has had time to equilibrate.

Current constant volume systems can accurately measure flow rates (e.g. within 1%) in a range of 0.01 standard cubic centimeters per minute (0.01 sccm) to 5 standard liters per minute (5 slpm), while current sonic nozzle systems can accurately measure flow rates in a range of 3 slpm to 30 slpm.

Consequently, embodiments of the present invention can employ a constant volume system 20 and a sonic nozzle system 30 that have overlapping ranges of operability. As the flow rate in system 10 approaches the upper limit of constant volume system 20's range of operability (or other arbitrary limit, typically in the overlap range), controller 60 can open valve 42, thereby allowing gas to flow through sonic nozzle 35. As an example of switching between using constant volume system 20 and sonic nozzle system 30 for determining the gas flow rate, assume constant volume system 20 employs a 10 liter constant volume chamber 25. If controller 60 detects that the flow rate (e.g. from the rate of pressure change in system 10) has exceeded 4.5 slpm (i.e. a rate of pressure change greater than 7 psi per minute), controller 60 can open valve 42 thereby directing the gas flow to sonic nozzle 35. Similarly if the detected flow rate drops below a preset value, say 4 slmp, controller 60 can close valve 42, thereby directing gas flow to constant volume system 20. Thus, embodiments of the present invention can employ a smart system able to transparently switch from low flow rate measurements using a constant volume to high flow rate measurements using a sonic nozzle (i.e., to switch between the first and second modes of operation). The preset thresholds discussed above were given by way of example only and any predefined parameter and threshold can be used. Moreover, the embodiments of the present invention can incorporate constant volume systems and sonic nozzle systems having wider ranges of operability as they are developed and the ranges given above do not limit the scope of the present invention.

According to one embodiment of the present invention, controller 60 can use the overlap range of operability to self-calibrate to account for changes in system 10, such as changes in the cross-sectional area of the sonic nozzle. Although the cross-sectional area of the sonic nozzle typically remains stable, tungsten, hexafloride and boron trichloride gases, and other toxic gasses associated with semiconductor manufacturing can leave deposits in sonic nozzle 35 causing the throat area of sonic nozzle 35 to change. If not accounted for, this can lead to inaccuracies in calculating the mass flow rate using on sonic nozzle system 30. Embodiments of the present invention can recalibrate to compensate for such a change without requiring removal and replacement of sonic nozzle 35.

Using the previous example in which the constant volume system and sonic nozzle system have an overlap range from 3 slmp to 5 slmp, a gas flow can be introduced to system 10 and controller 60 can calculate the mass flow rate from constant volume system 20 using EQ 1, above. If the flow rate is within the overlap range (e.g. 3–5 slmp in terms of volumetric flow rate), controller 60 can cause valve 42 to open, thereby directing the gas flow to sonic nozzle 70. When constant volume chamber 25 equilibrates and a steady pressure is established upstream of sonic nozzle 35, controller 60 can calculate the flow rate using sonic nozzle system 30. If the flow rate calculated using sonic nozzle system 30 does not match the flow rate calculated using constant volume system 20 within an acceptable degree of error, this can indicated that the cross sectional area of sonic nozzle 35 has changed. Controller 60 can calculate a new cross sectional area (A) for sonic nozzle 35 as follows:

$$A = \frac{massflowrate}{\rho\sqrt{\gamma RT}} \text{ or} \quad [EQ. 4]$$

$$A = \frac{massflowrate * RT}{P\sqrt{\gamma RT}} \quad [EQ. 5]$$

$A$ = cross sectional area of sonic nozzle
$\rho$ = gas density (known or equal to $P/(RT)$)
$R$ = gas constant
$T$ = Temperature
$P$ = Pressure upstream of sonic nozzle
$\gamma$ = Heat capacity ratio
$massflowrate$ = flow rate calculated from constant volume system.

Controller 60 can now use the new value for the cross sectional area of sonic nozzle 35 when calculating flow rates through sonic nozzle 35. In this manner, embodiments of the present invention can use the overlap range (e.g., 3 slpm to 5 slpm) to calibrate the sonic nozzle on a real time basis. The operating characteristics of the sonic nozzle allow for one point calibration and extension to higher flows. Recalibration of sonic nozzle 35 can occur according to a predetermined schedule or on an ad hoc basis. It should also be noted that if sonic nozzle 35 is adjustable, the same methodology can be used to determine the cross-sectional area of sonic nozzle 35 for various sized openings.

Embodiments of the present invention can also use the overlap range to calculate $\gamma$ (gamma) for a gas using constant volume system 20. To calculate $\gamma$, a gas flow can be directed to constant volume system 20 and the flow rate for the gas can be determined as discussed above. If the flow rate is within the overlap range (e.g. 3–5 slpm), controller 60 can direct the gas flow to sonic nozzle system 30. When a steady pressure establishes upstream of sonic nozzle 35, controller 60 can calculate gamma as follows:

$$\gamma = \frac{\left(\frac{massflowrate}{\rho A}\right)^2}{RT} \text{ or} \quad [EQ. 6]$$

$$\gamma = \frac{\left(\frac{RT * massflowrate}{PA}\right)^2}{RT} \quad [EQ. 7]$$

$\gamma$ = Heat capacity ratio
$A$ = cross sectional area of sonic nozzle
$\rho$ = gas density (known or equal to $P/(RT)$)
$R$ = gas constant
$T$ = Temperature
$P$ = Pressure upstream of sonic nozzle
$massflowrate$ = flow rate calculated from constant volume system.

In addition to calculating an unknown gamma, embodiments of the present invention can calculate gamma for a gas with a known gamma to determine if the controller must recalibrate. Controller 60 can calculate gamma for a gas for which gamma is already known, such as Nitrogen, using EQ. 7 or EQ 8. If the calculated gamma does not match the known gamma, this could indicate that the value for "A" being used by controller 60 is incorrect and should be recalculated. Additionally, the ability to calculate gamma for gas allows the speed of sound for a gas to be determined for various temperatures since the speed of sound for a gas is equal to the square root of $\gamma RT$.

Controller 60 can thus calculate the flow rate through system 10 using a constant volume system and a sonic nozzle system over a range of flow rates. The flow rate calculated by controller 60 can be used to calibrate mass flow controllers, as would be understood by those of ordinary skill in the art. If the constant volume system and sonic nozzle system have overlapping ranges of operability, controller 60 can use a flow rate calculated using the constant volume system to calculate the cross sectional area of the sonic nozzle, gamma for a particular gas, the speed of sound for a gas and other parameters.

According to one embodiment of the present invention, the system 10 can calibrated using a particular gas and this information can be extended to other gases. For example, the cross sectional area of the sonic nozzle can be determined for the system 10 using Nitrogen gas. This value can then be used in testing other gases in system 10.

Thus, embodiments of the present invention can include a primary fluid flow measurement system (e.g., a constant volume system), a secondary fluid flow measurement system (e.g., a sonic nozzle system) and a controller. In a first mode of operation, the controller can be configured to use the primary fluid flow measurement system to calculate a flow rate and, in a second mode operation, can be configured to calculate the flow rate using the secondary flow measurement system. The controller can automatically switch between the first mode of operation and second mode of operation. If the modes of operation have an overlap range of operability, the controller can calibrate the secondary flow measurement system using a flow rate calculated from the primary flow measurement system. Calibration data determined for one gas can then be used for other gases.

Figure 2:
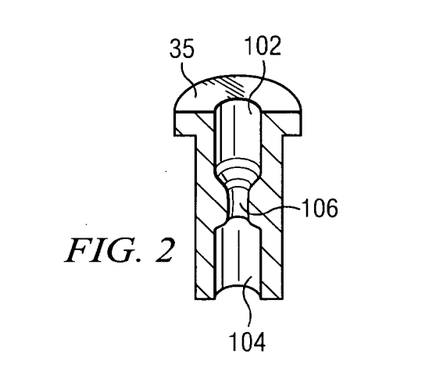
FIG. 2 is a diagrammatic representation of one embodiment of a sonic nozzle.
Figure 3:
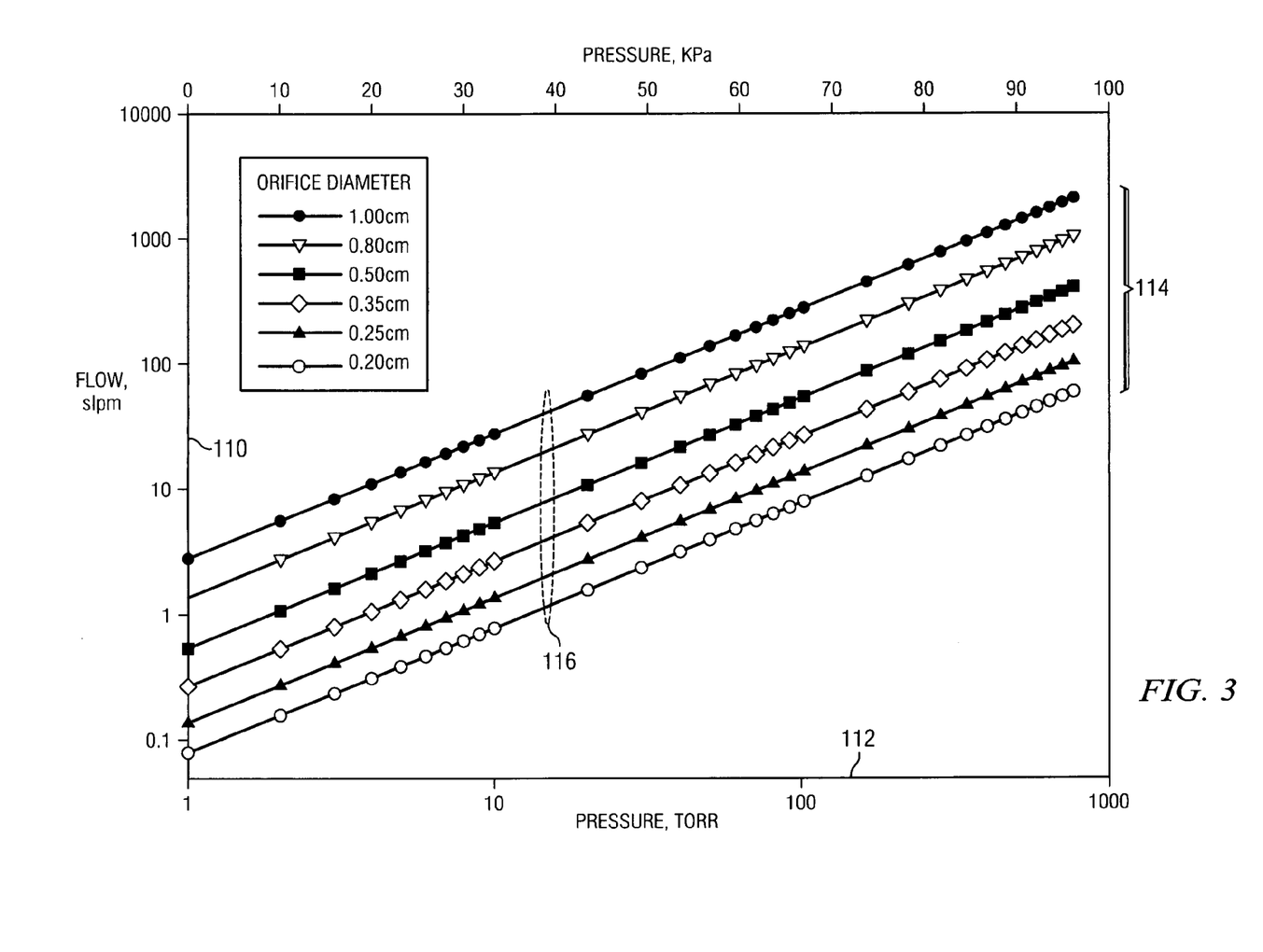
FIG. 3 is a graph illustrating examples of performance characteristics for various embodiments of sonic nozzles.

FIG. 2 is a cutaway view of one example of sonic nozzle 35 that can be employed in various embodiments of the present invention. Sonic nozzle 35 can have an inlet 102 and outlet 104 and a restricted cross sectional area or throat 106. Typically, for sonic nozzle 35 to adhere to EQ. 2 and EQ 3, the upstream pressure (e.g. inlet side pressure) must be at least two to three times the downstream pressure (e.g. outlet side pressure). For many applications, the primary parameter in selecting a sonic nozzle is the cross sectional area or throat diameter, which is generally selected based upon the desired flow range. FIG. 3 is a chart representing calculations for exemplary embodiments of sonic nozzles. Axis 110 represents the desired flow range at which the sonic nozzle will operate, axis 112 represent the pressure upstream of sonic nozzle 35 and lines 114 represent sonic nozzles having various throat diameters. In FIG. 3, if an embodiment of the present invention was designed to operate in a pressure range of 10–100 Torr (approximately represented by area 116), then, by way of example, a sonic nozzle having diameters from 0.2 cm to 1 cm could be selected. According to other embodiments of the present invention a variable orifice sonic nozzle can be used. Swagelok Company of Cleveland, Ohio, manufactures needle valves that can act as variable orifice sonic nozzles.

Figure 4:
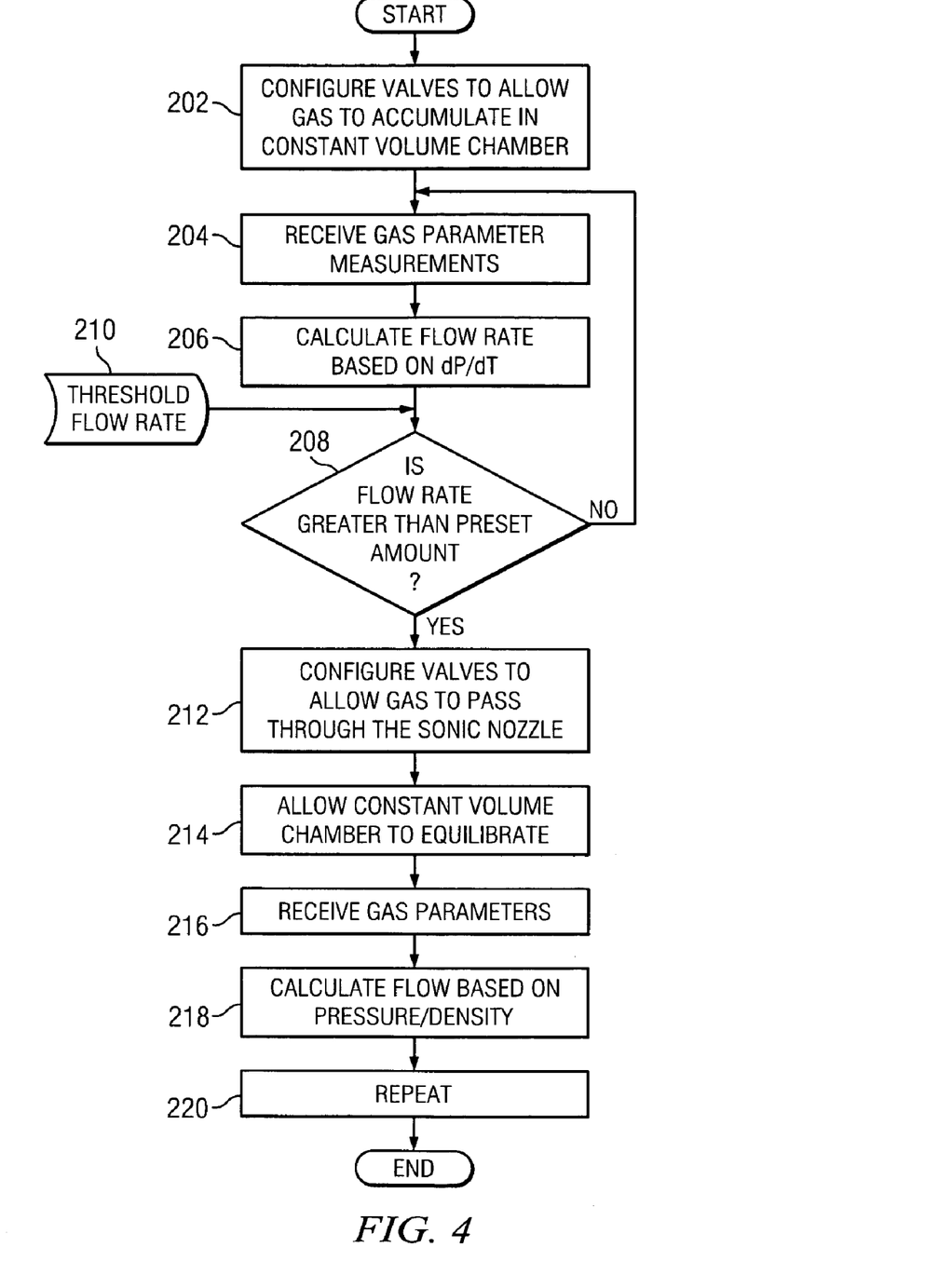
FIG. 4 is a flow chart illustrating one method of measuring flow rates according to an embodiment of the present invention.

FIG. 4 is a flow chart illustrating one method of measuring flow rates according to an embodiment of the present invention. The method of FIG. 4, in one embodiment of the present invention, can be implemented as a set of computer instructions that are executable by a computer processor and are stored on a computer memory of a controller. According to one embodiment of the present invention, the controller, at step 202, can configure a set of valves to allow a gas to accumulate in a constant volume chamber. As the gas accumulates in the constant volume chamber, the controller can receive measurements of gas parameters (e.g., temperature, pressure and or any other gas parameter known in the art) from one or more sensors (step 204) and can calculate the flow rate of the gas (step 206) based on the change in gas pressure over time. This can be done, for example according to EQ. 1.

At step 208, the controller can compare the calculated flow rate to a threshold flow rate 210. If the calculated flow rate does not exceed the threshold flow rate 210, control can return to step 204. If, on the other hand, the calculated flow rate exceeds threshold flow rate 210, the controller, at step 212, can configure the set of valves to allow the gas to pass through a sonic nozzle. When the valves are configured to allow gas to pass through the sonic nozzle, gas may still accumulate for a short while in the constant volume chamber. To account for this, or to otherwise allow the gas to reach an approximately steady state, the controller, at step 214, can delay calculating the flow rate for a predefined delay period.

The controller can receive measurements of various gas parameters (e.g., temperature, pressure and or any other gas parameter known in the art) (step 216) and, when the delay period has elapsed, can calculate the flow rate of the gas based on a pressure upstream of the sonic nozzle or the density of the gas upstream of the sonic nozzle according, for example, to EQ. 2 or EQ. 3 (step 218). The process of FIG. 4 can be arbitrarily repeated (step 220).

In the embodiment of FIG. 4, the controller switches between a first mode of operation (e.g., calculating the flow rate based on the change in pressure over time) to a second mode of operation (e.g., calculating the flow rate based on the pressure or density of the gas upstream of the sonic nozzle) based on whether the calculated flow rate exceeds a threshold flow rate. It should be noted however, that the controller can switch between modes of operation based on any predefined parameter. For example, switching between modes of operation can occur based on the magnitude of the change in pressure over time (dP/dt) or other arbitrarily defined parameter. Additionally, the parameter used to determine whether to switch from the first mode to the second mode can be different than the parameter used to determine whether to switch from the second mode to the first mode. For example, the controller can switch from the first mode of operation to the second mode of operation based on if (dP/dt) exceeds a particular value and can switch from the second mode of operation to the first mode of operation if the calculated flow rate drops below a predefined value.

Although the present invention has been described in detail herein with reference to the illustrative embodiments, it should be understood that the description is by way of example only and is not to be construed in a limiting sense. It is to be further understood, therefore, that numerous changes in the details of the embodiments of this invention and additional embodiments of this invention will be apparent to, and may be made by, persons of ordinary skill in the art having reference to this description. It is contemplated that all such changes and additional embodiments are within the spirit and true scope of this invention as claimed below.

What is claimed is:

1. A system of determining a flow rate of a fluid comprising:
   a constant volume chamber;
   a sonic nozzle in fluid communication with the constant volume chamber;
   one or more valves configured to direct a flow of a fluid to the constant volume chamber and the sonic nozzle;
   sensors configured to read one or more parameters of the fluid; and
   a controller coupled to the sensors configured to receive measurements from the sensors, the controller comprising:
      a processor;
      a memory accessible by the processor, the memory storing a set of computer instructions comprising instructions executable by the processor to:
         in a first mode of operation, calculate the flow rate as fluid accumulates in the constant volume chamber; and
         in a second mode of operation, calculate the flow rate as the fluid flows through the sonic nozzle; and switch between the first mode of operation and the second mode of operation after a delay to allow the constant volume chamber to equilibrate.

2. The system of claim 1, wherein, in the first mode of operation, the flow rate is calculated based on the change in pressure over time of the fluid.

3. The system of claim 2, wherein the flow rate is approximately calculated according to $$\frac{dm}{dt} = \frac{dP}{dt}\frac{V}{RT}.$$

4. The system of claim 1, wherein, in the second mode of operation, the flow rate is calculated based on a fluid pressure.

5. The system of claim 4, wherein, in the second mode of operation, the flow rate is approximately calculated according to $$massflowrate = \frac{PA\sqrt{\gamma RT}}{RT}.$$

6. The system of claim 1, wherein, in the second mode of operation, the flow rate is calculated based on a fluid density.

7. The system of claim 6, wherein, in the second mode of operation, the flow rate is approximately calculated according to $$massflowrate = \rho A \sqrt{\gamma RT}.$$

8. The system of claim 1,
wherein said one or more valves are further configured to regulate the flow through the system; and
wherein the computer instructions further comprise instructions executable to control said one or more valves to regulate the flow.

9. The system of claim 8, wherein said one or more valves comprise:
a first valve downstream of the constant volume chamber; and
a second valve downstream of the sonic nozzle.

10. The system of claim 1, wherein the flow rate comprises a mass flow rate.

11. The system of claim 1, wherein the flow rate comprises a volumetric flow rate.

12. The system of claim 1, wherein the computer instructions are executable to switch between the first mode of operation and the second mode of operation based on a predefined parameter.

13. The system of claim 1, wherein the sonic nozzle is a variable orifice sonic nozzle.

14. A method of determining a flow rate of a fluid comprising:
for a first mode of operation, calculating the flow rate as fluid accumulates in a constant volume chamber for a first range of flow rates; and
for a second mode of operation, calculating the flow rate as the fluid flows through a sonic nozzle;
delaying to allow the constant volume chamber to equilibrate; and
switching between the first mode of operation and the second mode of operation.

15. The method of claim 14, wherein, in the first mode of operation, the flow rate is calculated based on the change in pressure over time of the fluid.

16. The method of claim 15, wherein, in the first mode of operation, the flow rate is approximately calculated according to $$\frac{dm}{dt} = \frac{dP}{dt}\frac{V}{RT}.$$

17. The method of claim 14, wherein, in the second mode of operation, the flow rate is calculated based on a fluid pressure.

18. The method of claim 17, wherein, in the second mode of operation, the flow rate is approximately calculated according to $$massflowrate = \frac{PA\sqrt{\gamma RT}}{RT}.$$

19. The method of claim 14, wherein, in the second mode of operation, the flow rate is calculated based on a fluid density.

20. The method of claim 19, wherein, in the second mode of operation, the flow rate is approximately calculated according to $$massflowrate = \rho A \sqrt{\gamma RT}.$$

21. The method of claim 14, further comprising:
controlling one or more valves to regulate the flow to the constant volume chamber and sonic nozzle.

22. The method of claim 14, wherein the flow rate comprises a mass flow rate.

23. The method of claim 14, wherein the flow rate comprises a volumetric flow rate.

24. A system of determining a flow rate of a fluid comprising:
a constant volume chamber;
a sonic nozzle in fluid communication with the constant volume chamber;
one or more valves configured to direct a flow of a fluid to the constant volume chamber and the sonic nozzle;
sensors configured to read one or more parameters of the fluid; and
a controller coupled to the sensors configured to receive measurements from the sensors, the controller comprising:
a processor;
a memory accessible by the processor, the memory storing a set of computer instructions comprising instructions executable by the processor to:
in a first mode of operation, calculate the flow rate as fluid accumulates in the constant volume chamber; and
in a second mode of operation, calculate the flow rate as the fluid flows through the sonic nozzle;
switch between the first mode of operation and the second mode of operation;
calculate the flow rate according to the first mode of operation in an overlap range of flow rates; and calculate a cross sectional area of the sonic nozzle based on the flow rate calculated according to the first mode of operation.

25. The system of claim 24, wherein the cross sectional area of the sonic nozzle is approximately calculated according to $$A = \frac{massflowrate * RT}{P\sqrt{\gamma RT}}.$$

26. The system of claim 24, wherein the cross sectional area of the sonic nozzle is approximately calculated according to $$massflowrate = \rho A \sqrt{\gamma RT}.$$

27. A system of determining a flow rate of a fluid comprising:
   a constant volume chamber;
   a sonic nozzle in fluid communication with the constant volume chamber;
   one or more valves configured to direct a flow of a fluid to the constant volume chamber and the sonic nozzle;
   sensors configured to read one or more parameters of the fluid; and
   a controller coupled to the sensors configured to receive measurements from the sensors, the controller comprising:
      a processor;
      a memory accessible by the processor, the memory storing a set of computer instructions comprising instructions executable by the processor to:
         in a first mode of operation, calculate the flow rate as fluid accumulates in the constant volume chamber; and
         in a second mode of operation, calculate the flow rate as the fluid flows through the sonic nozzle;
         switch between the first mode of operation and the second mode of operation;
         calculate the flow rate according to the first mode of operation in an overlap range; and
         calculate a heat capacity ratio of the fluid based on the flow rate calculated according to the first mode of operation.

28. The system of claim 27, wherein the heat capacity ratio is approximately calculated according to $$\gamma = \frac{\left(\frac{RT * massflowrate}{PA}\right)^2}{RT}.$$

29. The system of claim 27, wherein the heat capacity ratio is approximately calculated according to $$\gamma = \frac{\left(\frac{massflowrate}{\rho A}\right)^2}{RT}.$$

30. A method of determining a flow rate of a fluid comprising:
   for a first mode of operation, calculating the flow rate as fluid accumulates in a constant volume chamber for a first range of flow rates; and
   for a second mode of operation, calculating the flow rate as the fluid flows through a sonic nozzle;
   switching between the first mode of operation and the second mode of operation;
   calculating the flow rate according to the first mode of operation in an overlap range of flow rates; and
   calculating a cross sectional area of the sonic nozzle based on the flow rate calculated according to the first mode of operation.

31. The method of claim 30, wherein the sonic nozzle is a variable orifice sonic nozzle.

32. The method of claim 30, wherein the cross sectional area of the sonic nozzle is approximately calculated according to $$A = \frac{massflowrate * RT}{P\sqrt{\gamma RT}}.$$

33. A method of determining a flow rate of a fluid comprising:
   for a first mode of operation, calculating the flow rate as fluid accumulates in a constant volume chamber for a first range of flow rates; and
   for a second mode of operation, calculating the flow rate as the fluid flows through a sonic nozzle;
   switching between the first mode of operation and the second mode of operation
   calculating the flow rate according to the first mode of operation in an overlap range; and
   calculating a heat capacity ratio of the fluid based on a the flow rate calculated according to the first mode of operation.

34. The method of claim 33, wherein the heat capacity ratio is approximately calculated according to $$\gamma = \frac{\left(\frac{RT * massflowrate}{PA}\right)^2}{RT}.$$

35. The method of claim 33, wherein the heat capacity ratio is approximately calculated according to $$\gamma = \frac{\left(\frac{massflowrate}{\rho A}\right)^2}{RT}.$$

* * * * *